Nov. 29, 1927.
E. SEIKMAN
1,650,965
POULTRY FEEDER
Filed Nov. 2, 1926
2 Sheets-Sheet 1
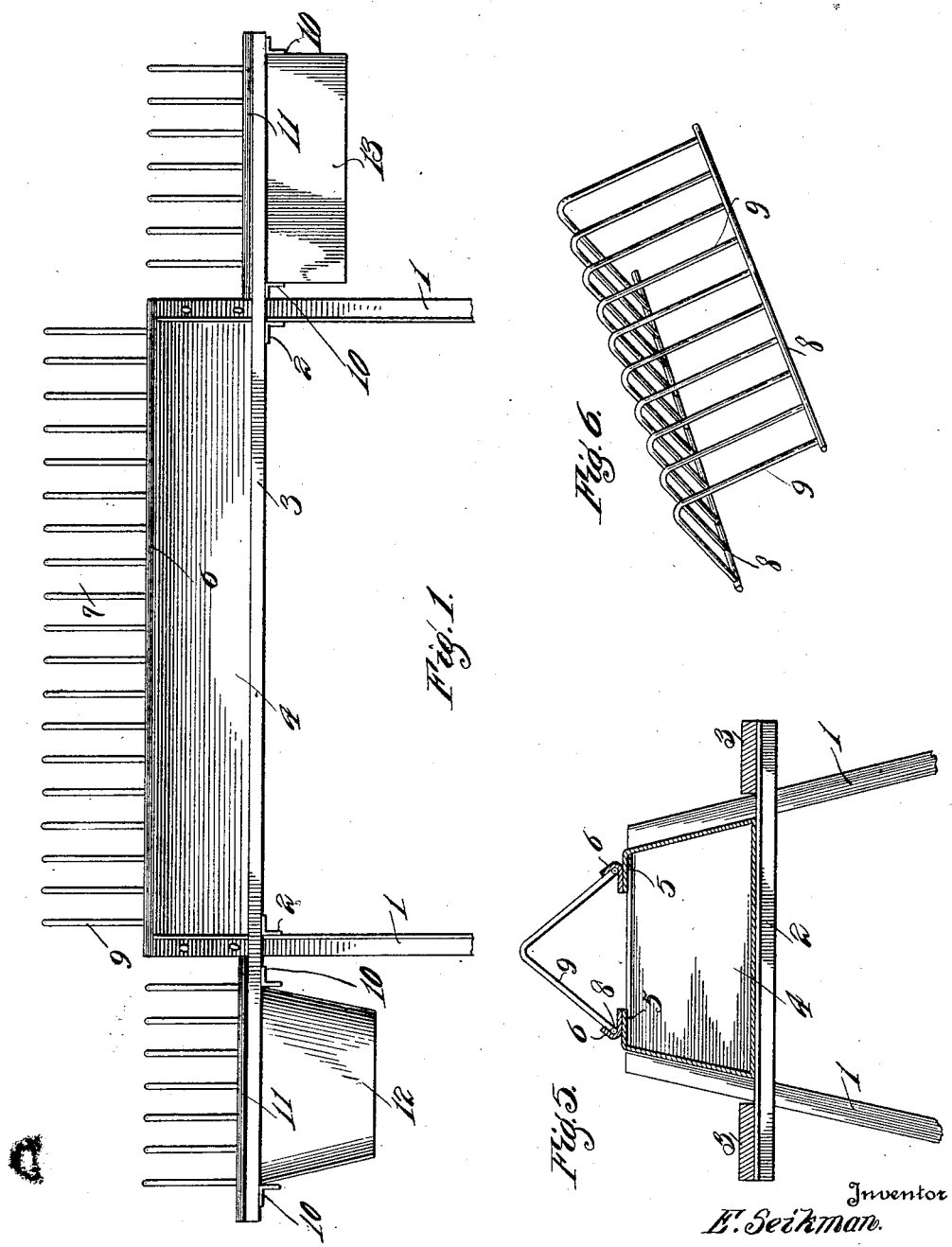

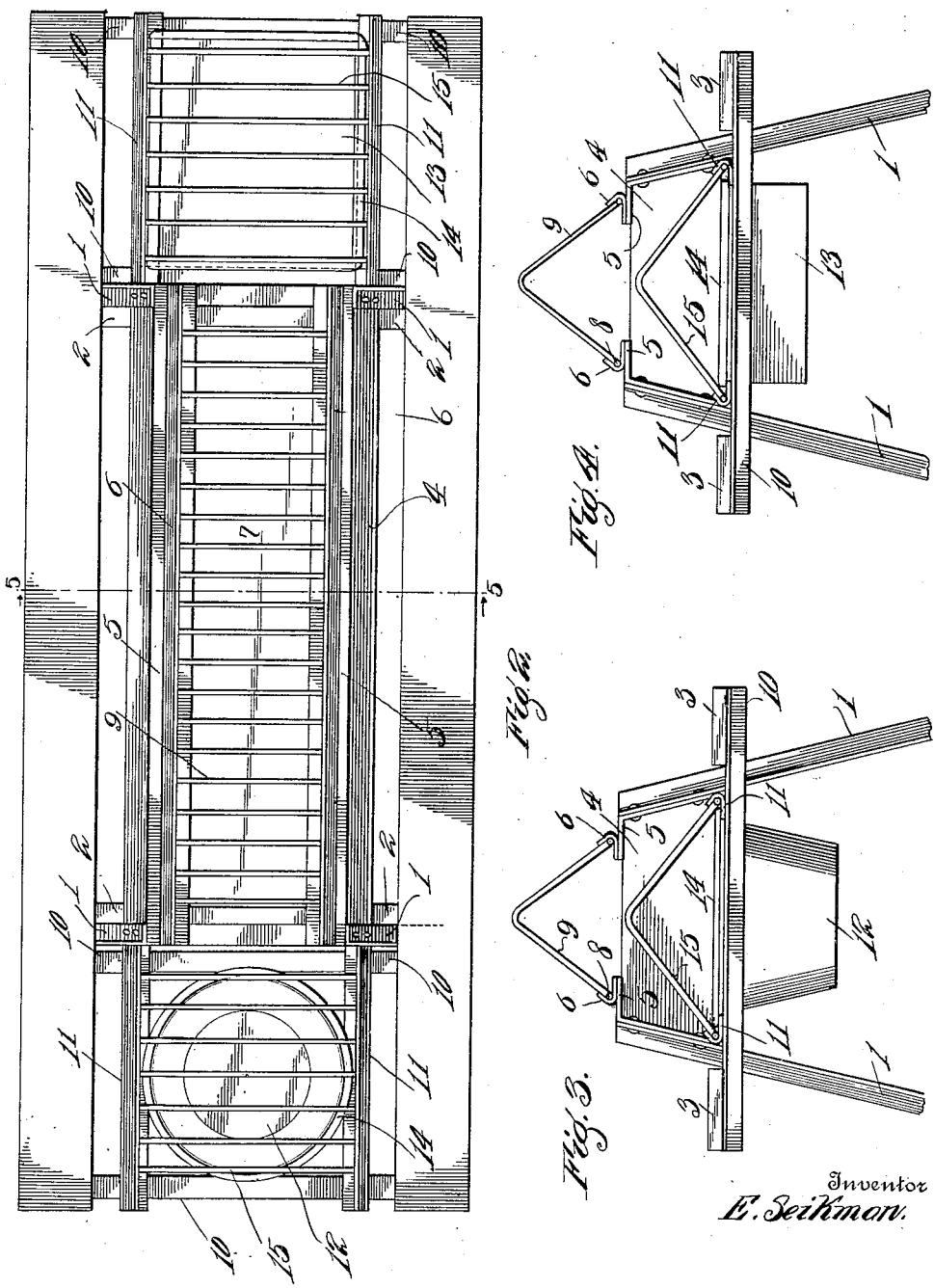

Patented Nov. 29, 1927.

1,650,965

UNITED STATES PATENT OFFICE.

EDWARD SEIKMAN, OF WICHITA, KANSAS.

POULTRY FEEDER.

Application filed November 2, 1926. Serial No. 145,797.

This invention relates to poultry feeders and has for its object the provision of a simple, strong, durable, inexpensive device, by the use of which poultry may obtain an adequate supply of feed without crowding and without wasting the feed.

A further object of the invention is to provide a structure for the stated purpose, of such form that the fowls cannot roost thereon and which will facilitate cleaning of the same so that it may be easily kept in a sanitary condition. Other objects of the invention will appear incidentally in the course of the following description and the invention resides in certain novel features which will be particularly pointed out in the appended claims.

In the drawing:

Figure 1 is a side elevation of a poultry feeder embodying my present invention;

Fig. 2 is a plan view of the same;

Fig. 3 is an elevation of one end of the apparatus;

Fig. 4 is a similar view of the opposite end;

Fig. 5 is a transverse section, and

Fig. 6 is a detail perspective view of a portion of the divider cover.

In carrying out the invention, I employ a plurality of legs or posts 1 which are preferably arranged in rectangular relation and may be angle bars of sheet metal, the corresponding legs at the ends of the apparatus converging upwardly. Near the upper ends of these legs or posts are secured similar cross bars 2 which project beyond the sides of the posts and have flat rails or platforms 3 secured upon their projecting ends, the said platforms or rails extending the full length of the device and beyond the posts at both ends. Resting upon the cross bars 2 between the upper ends of the posts, and rigidly secured to the posts, is a trough 4 which is relatively shallow and has closed upwardly and inwardly inclined sides so that it will retain the feed placed therein against loss. The upper edge portions of the sides of the trough are carried inwardly, as shown at 5, to form overhanging flanges, so that the feeding fowls will be forced to reach toward the center of the trough and will be thereby prevented from drawing over the sides of the trough an excessive quantity of the feed and causing waste of the same. Extending longitudinally of the flanges 5 on top of the same are guides 6 which are open-ended and open at their inner opposed sides, and engaged in these guides is a divider cover 7 consisting of side bars or rods 8, equal in length to the feed trough 4, and inverted V-shaped rods 9 rising from the said rods 8 and secured at their ends to the said rods so that they will bridge the space between them and extend over the trough when in operative position. The inverted V-shaped rods 9 are obviously disposed transversely of the trough when placed in position thereon and are spaced apart through the entire length of the trough so that they serve as dividers to prevent crowding of the fowls and provide spaces of such width as to each admit the head of only one fowl at each side of the trough. The inverted V-shaped form of these rods also prevents the fowls roosting thereon so that befoulment of the trough is obviated. It will be understood that the entire divider cover may be slid endwise into position by engaging the ends of the base rods 8 within the open ends of the guides 6 and then merely pushing the divider cover along the guides.

To the projecting end portions of the rails or platforms 3, I secure cross bars 10 which are similar to the cross bars 2 and to these cross bars I secure longitudinal bars 11 which correspond to the guides 6 upon the trough. These cross bars 10 and longitudinal bars 11 define an open frame through which a pail 12 or a pan 13 may be inserted downwardly and supported by having the rim or flange members 14 of the pan or pail, respectively, rest upon the upper surface of the bars 10 and 11 in an obvious manner. The pail 12 may contain water and the pan 13 may also contain water or may be filled with feed supplemental to the feed in the main trough 4 or with material intended to condition the fowls and aid digestion. A divider cover 15 is disposed over the pail and the pan, respectively, the construction of the divider cover 15 being the same in all respects, except length, as the first described divider cover 7. The divider cover 15 is fitted in place by engaging it endwise in the guides presented by the bars 11 and then sliding it along the same exactly as the divider cover 7 is secured in place.

The manner of using the device is thought to be evident from the foregoing description taken in connection with the accompanying drawing. The rails or platforms 3 provide foot rests which are easily accessible to the fowls and upon which they may stand while feeding. Crowding of the fowls will be prevented by the divider rods 9 and also by the relatively narrow proportions of the platforms 3 inasmuch as crowding of the fowls will obviously prevent the one attempting to crowd in obtaining a firm foothold upon the rail. The device is easily kept in a sanitary condition and a sufficient supply of feed and other elements necessary for the proper conditioning and health of the fowls may be easily maintained without requiring constant attention upon the part of the owner.

Having thus described the invention, what I claim is:

1. A device for the purpose set forth comprising a supporting frame, a trough carried by said frame and provided with inwardly projecting overhanging flanges along its sides at its top, open-ended guides secured upon the upper sides of said flanges and coterminous therewith, and a divider cover engaged endwise in said guides and retained on the trough thereby.

2. A device for the purpose set forth comprising a supporting frame, a trough carried by the frame, rails carried by the frame at the sides of the trough and projecting beyond the ends of the trough, supplementary frames secured to and between the projecting ends of the rails, and receptacles removably supported by said supplementary frames.

In testimony whereof I affix my signature.

EDWARD SEIKMAN. [L. S.]